(12) United States Patent
Ziegerhofer

(10) Patent No.: US 11,288,120 B2
(45) Date of Patent: Mar. 29, 2022

(54) CIRCUIT AND METHOD FOR SOFT-ERROR PROTECTION IN OPERATION OF ECC AND REGISTER

(71) Applicant: MARVELL ASIA PTE LTD., Singapore (SG)

(72) Inventor: Michael A. Ziegerhofer, Jeffersonville, VT (US)

(73) Assignee: MARVELL ASIA PTE LTD., Singapore (SG)

( * ) Notice: Subject to any disclaimer, the term of this patent is extended or adjusted under 35 U.S.C. 154(b) by 136 days.

(21) Appl. No.: 16/817,717

(22) Filed: Mar. 13, 2020

(65) Prior Publication Data
US 2021/0286672 A1 Sep. 16, 2021

(51) Int. Cl.
*G06F 11/10* (2006.01)
*G06F 9/30* (2018.01)

(52) U.S. Cl.
CPC ...... *G06F 11/1076* (2013.01); *G06F 9/30134* (2013.01)

(58) Field of Classification Search
CPC .......................... G06F 11/1076; G06F 9/30134
See application file for complete search history.

(56) References Cited

U.S. PATENT DOCUMENTS

| 5,754,567 A * | 5/1998 | Norman ............... G06F 11/1068 714/773 |
| 5,774,470 A * | 6/1998 | Nishiya ............ G11B 20/10009 714/703 |
| 5,978,952 A | 11/1999 | Hayek et al. |
| 6,856,660 B1 * | 2/2005 | Watanabe ........ G11B 20/10009 375/363 |
| 2003/0070124 A1 * | 4/2003 | Koike ................... G06F 11/221 714/712 |

* cited by examiner

*Primary Examiner* — Kyle Vallecillo

(57) ABSTRACT

Embodiments of the present disclosure provide an a circuit including: first logic to compare output data from the shift register with output data from error correcting code circuitry (ECC), to output an error signal in response to a data bit output from the shift register being different from a data bit output from the ECC; second logic for receiving the error signal from the first logic gate, and a correctability signal from the ECC, to output an overwrite signal in response to receiving the error signal and the correctability signal; and a selector receiving the overwrite signal and the data bit of the output data from the ECC, and coupled between a data source and an input line to the shift register. The selector causes the shift register to receive the ECC output in response to receiving the overwrite signal.

20 Claims, 3 Drawing Sheets

CIRCUIT AND METHOD FOR SOFT-ERROR PROTECTION IN OPERATION OF ECC AND REGISTER

TECHNICAL FIELD

Embodiments of the disclosure relate generally to a circuit and method to replace bit values in a shift register to prevent data corruption. Embodiments of the disclosure may operate in conjunction with the shift register and error-correcting code circuitry (ECC) to replace errors in the shift register.

BACKGROUND

The rise of networking devices, such as the "Internet of Things" (IoT), with links to a data center has expanded the need for robust protection against soft-errors in digital circuitry that drive critical tuning data to all memories on a given chip required for seamless system operation. Error-correcting code (ECC) circuitry may be coupled to the output of a shift register to provide this protection. A standard ECC circuit has the ability to identify incorrect bits within the register and can correct the data as it passes through the ECC logic. One disadvantage to the ECC logic is that it can only correct a single error and any additional soft-errors that follow are not corrected and merely reported as incorrect, which will require a full system re-boot to refresh the register data.

SUMMARY

A first aspect of the present disclosure provides a circuit for replacing bit values in a shift register, the circuit including: a first logic gate for comparing output data from the shift register with output data from an error-correcting code circuitry (ECC), wherein the first logic gate outputs an error signal in response to a data bit output from the shift register being different from a data bit output from the ECC; a second logic gate for receiving the error signal from the first logic gate, and a correctability signal from the ECC indicating the data bit output from the shift register as being correctable, wherein the second logic gate outputs an overwrite signal in response to receiving the error signal and the correctability signal; and a selector receiving the overwrite signal and the data bit of the output data from the ECC, and coupled between a data source and an input line to the shift register, wherein the selector causes the shift register to receive the data bit of the output data from the ECC in response to receiving the overwrite signal.

A second aspect of the present disclosure provides an apparatus including: a shift register for driving operation of a digital circuit; an error-correcting code circuitry (ECC) receiving an output from the shift register, the ECC being coupled to identify error bits in the output signal and classify the error bits as being a correctable error or a non-correctable error; first logic gate for comparing the output from the shift register with an output from the ECC, wherein the first logic gate outputs an error signal in response to a data bit output from the shift register being different from a data bit output from the ECC; a second logic gate for receiving the error signal from the first logic gate, and a correctability signal from the ECC indicating the data bit output from the shift register as being a correctable error, wherein the second logic gate outputs an overwrite signal in response to receiving the error signal and the correctability signal; and a selector receiving the overwrite signal and the data bit of the output data from the ECC, and coupled between a data source and an input line to the shift register, wherein the selector causes the shift register to receive the data bit of the output data from the ECC in response to receiving the overwrite signal.

A third aspect of the present disclosure provides a method for replacing bit values in a shift register, the method including: comparing output data from the shift register with output data from an error-correcting code circuitry (ECC); identifying an error in response to a data bit output from the shift register being different from a data bit output from the ECC; determining whether the error is a correctable error based on the ECC; and replacing a data input to the shift register with the output data from the ECC in response to identifying the error, and determining the error as correctable.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
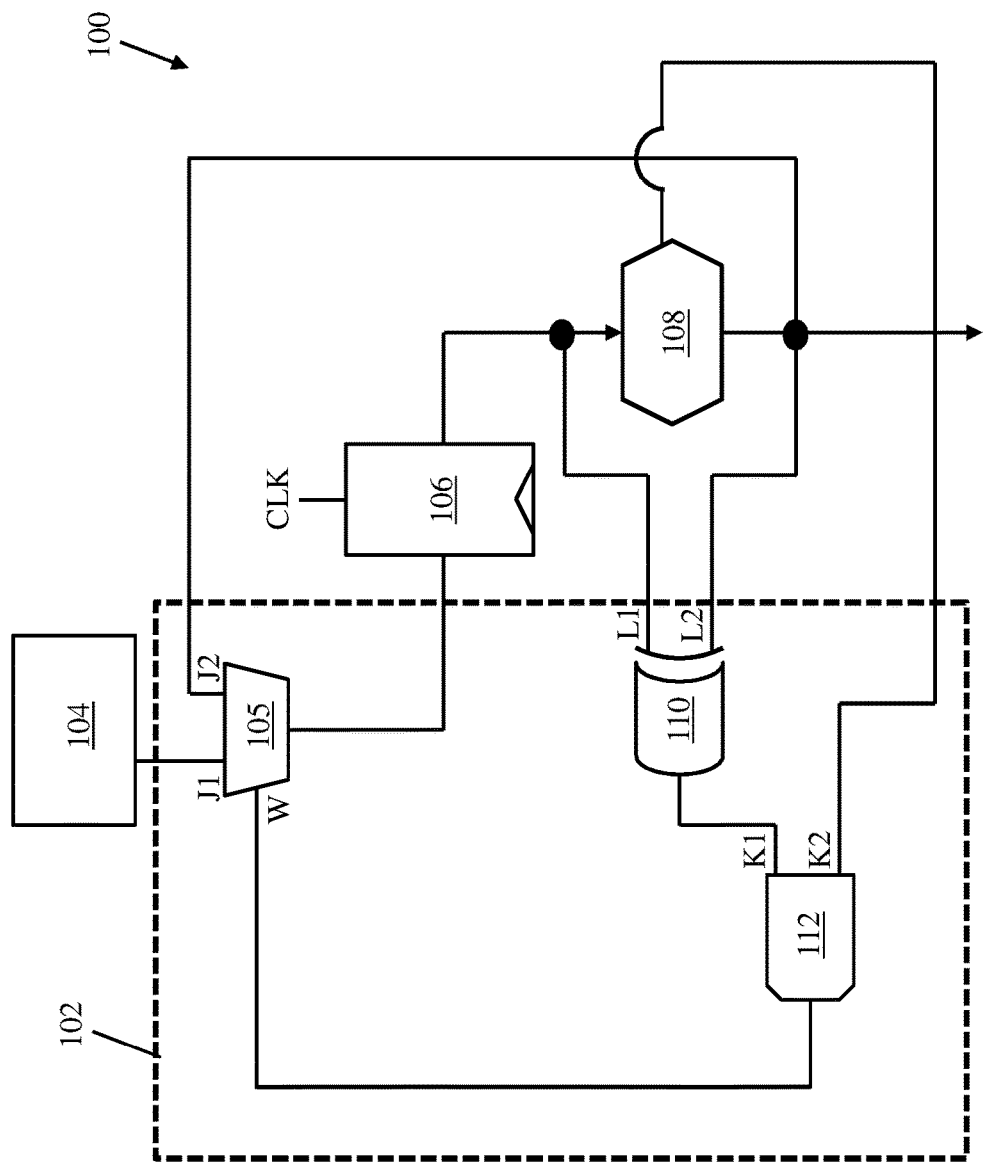
FIG. 1 shows a schematic view of a circuit and apparatus according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the present disclosure provide a circuit and related method to replace bit values in a shift register after detecting a single error correction by error-correcting code circuitry (ECC) coupled to the shift register. Embodiments of the disclosure may include a circuit coupled to a shift register, e.g., a serial-in serial-out (SISO) register for receiving input data, and ECC. Embodiments of the disclosure operate by comparing output data from the shift register with output data from the ECC. During operation, the circuit compares the bit exiting the shift register with the bit exiting the ECC to determine whether the ECC applied a single bit correction to the data. Embodiments of the disclosure then determine whether the erroneous bit is capable of being replaced directly within the shift register. In the event that the erroneous bit can be replaced (i.e., the error is "correctable"), the circuit may replace the incorrect register value with the corrected value. Applying such a correction will thereby allow the ECC to correct other errors later in time.

To implement these functions, embodiments of the disclosure may include a first logic gate for comparing the output data from the shift register with output data from the ECC. The output from the first logic gate may be transmitted to a second logic gate, along with data from the ECC indicating whether the data is correctable. A selector (e.g., a digitally-operated switch) may receive an overwrite signal as a digital feedback from the second logic gate. The selector may selectively transmit the ECC output to the shift register to correct the error by replacing the erroneous bit within the shift register. This process refreshes the shift register to allow the ECC to correct a single error event during a subsequent clock cycle, allowing the error correction capabilities to be extended. Embodiments of the disclosure are thus able to prevent data corruption during the operation of a circuit by continuously identifying any number of ECC errors so long as they come in serially over time (i.e., on every clock cycle). Thus, after the ECC corrects a given bit, the register is updated to the corrected value in order to free up the ECC. This allows the ECC to correct another soft-error found later in time and the process is repeated indefinitely. Embodiments of the disclosure may extend the ability of the ECC and adds robustness to the system to maintain continuous operation.

Referring to FIG. 1, an apparatus 100 including a circuit 102 is shown according to embodiments of the disclosure. Apparatus 100 may include various elements of digital circuitry, which may operate in tandem with various components of circuit 102 as discussed herein. An external circuit 104, representing any conceivable circuit configured to transmit data in the form of a serial or parallel data string, may transmit data to circuit 102. Embodiments of circuit 102 are described herein as being configured to process a serial data input from external circuit 104, but further embodiments of circuit 102 may be capable of processing parallel data inputs via modified and/or additional components, e.g., a serializer or deserializer connected to the output of external circuit 104 and/or provided elsewhere in apparatus 100. A selector 105 may receive the input data from external circuit 104. Selector 105 may be provided as a digitally-operated switch, e.g., a set of transistors formed within apparatus 100, and may select one of two or more inputs for transmission as a data input to a shift register 106. In an initial state, selector 105 may cause the data input from external circuit 104 to pass to shift register 106. The circumstances in which selector 105 may select other inputs for transmission to shift register 106 are discussed in further detail elsewhere herein.

A shift register 106 may provide a clock-driven digital memory of apparatus 100 to process data for transmission to other components. A shift register refers to a digital circuit element made up of several cascaded flip flops (not shown), each of which may be driven by a single clock input (CLK: in FIG. 1). A flip flop may represent any circuit that has two stable states and can be used to store state information, including latches and/or other types of digital memory. The output of each flip flop within shift register 106 is connected to the data input line of the next flip flop in the chain of interconnected flip flops. During operation, the data recorded in the flip flops of shift register 106 will shift by one position (i.e., by one successive flip flop) as each new bit is written to shift register 106. At each up or down transition of clock input CLK, a new bit will be written into shift register 106 and shifted out of the flip flop array. Shift registers may take a variety of forms and may be configured to operate with serial or parallel data structures. In some cases, shift register 106 may take the form of a serial-in serial-out (SISO) register or a parallel-in parallel-out (PIPO) register. In still further examples, shift register 106 may convert one type of input to another, e.g., by functioning as a serial-in parallel-out (SIPO) or parallel-in serial out (PISO) register. The details of such configurations are well known to those of ordinary skill in the art. Shift register 106 is shown by example as being a SISO register, but it is understood that shift register 106 may be provided using any conceivable register configuration.

Shift register 106 may output digital data (i.e., data bits) to an error-correcting code circuitry (ECC) 108. ECC 108 is a type of memory which detects and corrects for erroneous bits of digital data before the data is transmitted to other components of a circuit. ECC 108 may operate, e.g., by maintaining a memory system that is immune to single-bit errors. ECC 108 differs from conventional error checks by creating an encrypted code associated with a digital word when writing the data to memory. The code may be represented as a separate digital word, and the data bits within the code may be known as "syndrome data." When the data is read, the code is compared with original code previously stored in memory. If the code that is read does not match the stored code, it may be decrypted to identify erroneous bits in the word during a read operation. ECC may be configured to correct such erroneous bits at the time of reading, before they are transmitted to other circuit components, e.g., as a data output.

ECC 108 is operable to detect various types of single-bit errors. One error type of particular concern is a "soft error." Soft errors refer to single data bits that are written or read differently than as originally intended. The rate at which soft errors pass through ECC 108 is known as the "soft error rate" or simply SER. Soft errors originate from sources external to ECC 108 and, more generally, apparatus 100. Soft errors may originate at a variety of locations, e.g., within a data repository or other storage system, within the central processing unit (CPU), through network connections, and/or inherently from various types of memory architectures. Soft errors are distinguished from "hard errors" caused by physical factors other than internal electrical problems of a circuit, e.g., temperature variations, voltage stress, physical stress, manufacturing errors, etc. ECC 108 may include control logic and/or other data storage for distinguishing between different types of errors, e.g., hard errors and soft errors. Specifically, ECC 108 is operable to detect whether the error is a single bit error or a multiple bit error. A single bit error may be correctable by replacing the incorrect bit in shift register 106 via circuit 102, while multiple bit errors may require further action (e.g., temporary disabling of apparatus 100). Embodiments of the disclosure work in tandem with ECC 108 to overwrite correctable errors within shift register 106.

In conventional settings, ECC 108 will operate independently of shift register 106 to identify and output corrected data bits to other circuit components. This may pose an issue, e.g., where there are multiple SER events after a single bit ECC correction because such an event will cause the ECC to not correct, but merely detect multiple errors. Embodiments of circuit 102 thus provide a feedback loop which uses data exiting shift register 106 and data exiting ECC 108 to replace data within shift register 106, where possible. Circuit 102 may include, e.g., a first logic gate 110 having two inputs: one input L1 for receiving the data output from shift register 106 before it enters ECC 108, and another input L2 for receiving the data output from ECC 108. First logic gate 110 may include, e.g., an exclusive OR (XOR) gate for determining whether two digital input signals are equal to each other. In further embodiments, first logic gate 110 may include a set (i.e., one or more) of compare function logic circuits for electrically implementing a similar determination. First logic gate 110 may be embodied as any conceivable device for implementing the processes described herein. First logic gate 110 may output a logic low or a logic high in response to inputs L1, L2 being the same, or the opposite logic level in response to inputs L1, L2 being different from each other. Thus, first logic gate 110 is operable to compare output data from shift register 106 with output data from ECC 108 to determine whether ECC 108 identified and corrected an error. The digital output from first logic gate 110 is labeled as K1 in FIG. 1, and represents an "error signal," i.e., another digital input to a second logic gate 112 as discussed herein.

Circuit 102 may include second logic gate 112 for receiving the error signal (K1) from first logic gate 110. Error signal K1 may indicate whether ECC 108 has corrected an erroneous bit in the output data from shift register 106 as described herein. Second logic gate 112 may also receive a correctability signal directly from ECC 108 as a second digital input (K2) thereto. As discussed elsewhere herein, ECC 108 may include circuitry for distinguishing between multiple types of errors, e.g., single bit or multiple bit errors, based on the code(s) applied to each digital word. Such error types may be variously classified as "correctable" or "non-correctable" via shift register 106 in the internal control logic of ECC 108. A correctable error, in this context, refers to a single error that may be prevented in further operation by modifying the data within shift register 106. Non-correctable errors, in this context, may refer to simultaneous multiple error (e.g., double-error detect (DED)) events which indicate the corruption of data. In this case, shift register 106 could be refreshed to correct the data. Embodiments of the disclosure are operable to correct single-error events via feedback to shift register 106 without disabling the operation of apparatus 100.

Second logic gate 112, upon receiving digital inputs K1, K2, can digitally determine whether an error exists and whether the error is correctable via shift register 106. In some embodiments, second logic gate 112 may be provided as an AND gate for outputting a predetermined logic level when digital inputs K1, K2 are of the same predetermined logic level. For example, digital inputs K1, K2 both being logic high may indicate the presence of an error, and an error type that is correctable via shift register 106. In this example, any other combination of logic including K1, K2 both being logic low would indicate the lack of a correctable error. In further embodiments, second logic gate 112 may include a set (i.e., one or more) of true function logic circuits for electrically implementing a similar determination. Second logic gate 112 may be embodied as any conceivable device for implementing the processes described herein. Thus, second logic gate 112 may output a logic high in response to K1 and K2 being a logic high but will output a logic low in response receiving to any other combination of digital inputs. The digital signal output from second logic gate 112 is referred to as an "overwrite signal" (labeled W in FIG. 1), and may indicate whether a data bit in shift register 106 will be overwritten as discussed herein.

Selector 105 of circuit 102 may be coupled to two digital inputs J1, J2, either of which may be transmitted to shift register 106 to be written into its data. As noted elsewhere herein, selector 105 may take the form of a digitally-controlled switch which selects one of two alternative inputs (labeled J1, J2 in FIG. 1) for transmission as a data input to shift register 106. Digital input J1 may be a data input from external circuit 104, while digital input J2 may be a corrected data bit from ECC 108. The overwrite signal W transmitted from second logic gate 112 may control whether selector 105 allows digital input J1 or digital input J2 to be transmitted to shift register 106. Where errors are not present and/or not correctable via shift register 106, overwrite signal W may be at a first logic level (e.g., logic low) and thereby cause selector 105 to transmit digital input J1 to shift register 106. In cases where errors are both present in the data, and correctable via shift register 106, overwrite signal W may be the opposite logic level (e.g., logic high) and thereby cause selector 105 to transmit digital input J2 to shift register 106. Where digital input J2 is transmitted to shift register 106, the corrected data bit will replace the erroneous data bit in shift register 106. In the specific example of shift register 106 being a SISO register, digital input J2 will replace a bit stored on a latch of the SISO register to correct the error within shift register 106. Thus, ECC 108 may identify and correct other erroneous bits during continued operation, instead of dedicating resources to correction of previously-identified errors.

Figure 2:
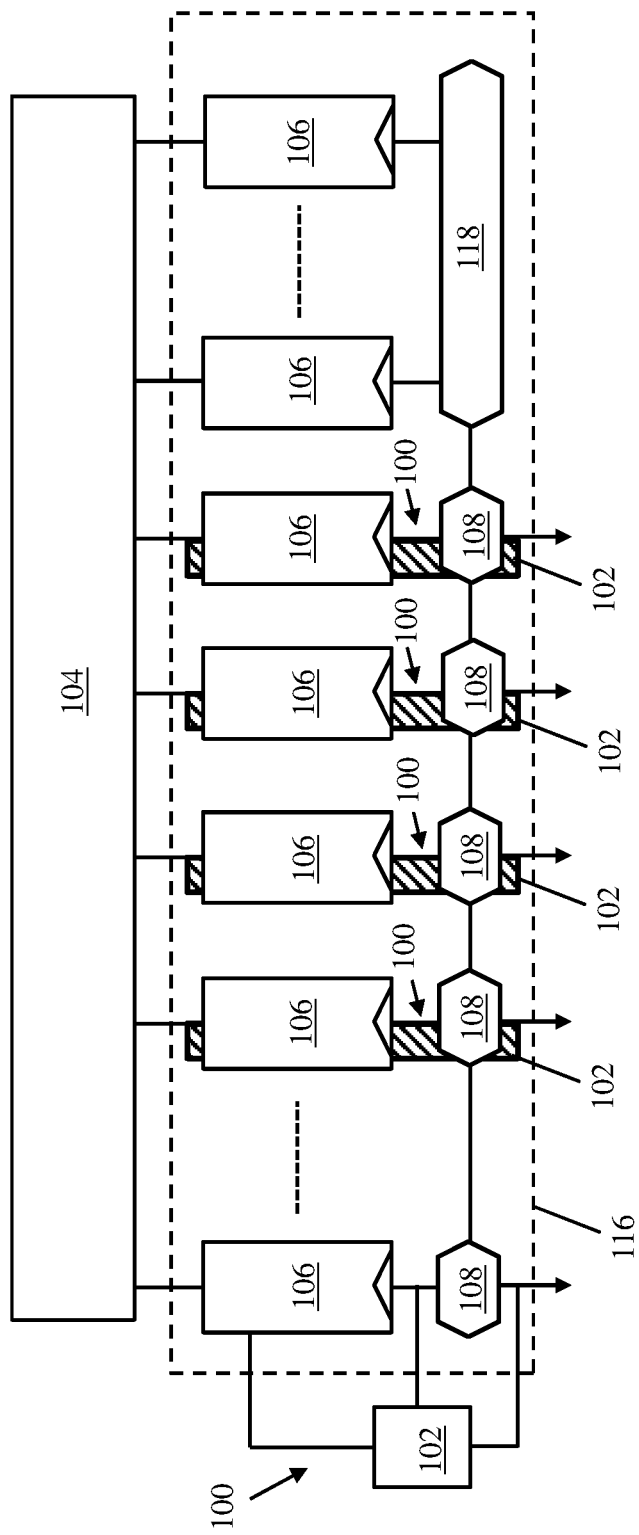
FIG. 2 shows a schematic view of a memory circuit with multiple circuits and apparatuses according to embodiments of the disclosure.

Turning to FIG. 2, embodiments of the disclosure provide a memory circuit 116 according to various embodiments of the disclosure. Memory circuit 116 may be provided in an "ECC region" of a device, e.g., any configuration of digital circuitry which operates in tandem with ECC 108 as discussed elsewhere herein. Memory circuit 116 may include a plurality of apparatuses 100 and/or circuits 102 according to embodiments of the disclosure (e.g., as shown by example in FIG. 1). Apparatuses 100 and/or circuits 102 may be arranged in a parallel data formation, e.g., such that each shift register 106 and ECC 108 process respective parallel data bits from external circuit 104. One unit of apparatus 100 and circuit 102 (i.e., the left-most unit) is shown in an expanded illustration in FIG. 2, while other units of apparatus 100 and circuit 102 are illustrated in a simplified format solely for ease of illustration. Memory circuit 116 may include, e.g., additional shift registers 106 for producing syndrome data 118 simultaneously with the data bits processed via apparatus 100 and/or circuit 102. Syndrome data 118 may represent the bits within an error code for distinguishing between different error types as discussed herein, and thus provide the data for decrypting and processing ECC codes in the event of an error. As shown via memory circuit 116, embodiments of the disclosure may operate on shift register(s) 106 and ECC 108 without modifying an existing configuration of such components, and/or otherwise modifying their operation.

Figure 3:
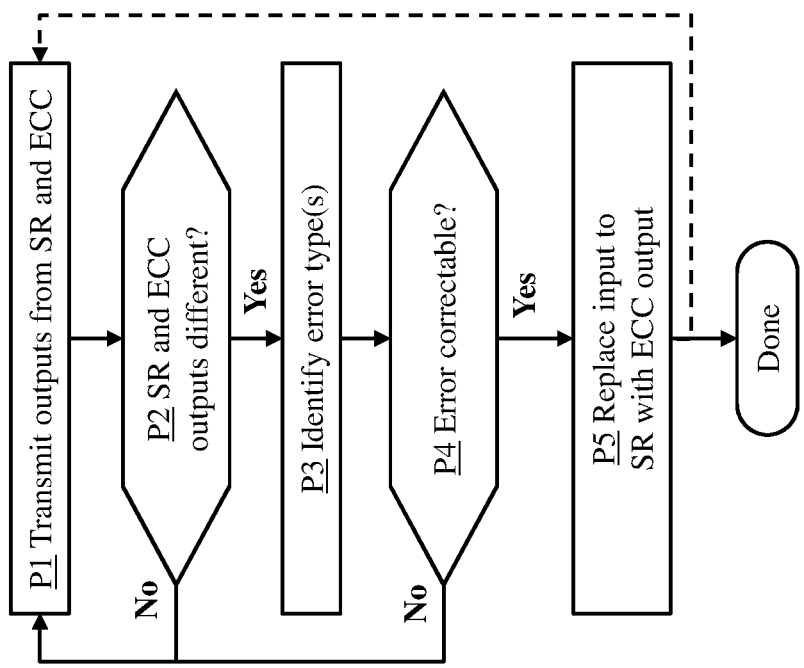
FIG. 3 provides an illustrative flow diagram for implementing a method according to embodiments of the disclosure.

Referring to FIGS. 1 and 3 together, embodiments of apparatus 100 and/or circuit 102 may implement methods for replacing bit values in a shift register according to various embodiments of the disclosure. A generalized method according to embodiments of the disclosure may include, e.g., determining whether data transmitted from shift register 106 is different from data exiting ECC 108, determining whether the erroneous data is correctable via shift register 106, and correcting the erroneous data within shift register 106 upon determining that the erroneous data may be corrected.

Methods according to the disclosure may include process P1 of transmitting data outputs from shift register 106 (abbreviated as SR in FIG. 3) and a corresponding data output from ECC 108. The outputs from each element may be transmitted as respective data bits as digital inputs to first logic gate 110, such as an XOR gate or equivalent processing hardware for comparing two data bits using an XOR operation. Process P2 according to the disclosure may include determining (e.g., using first logic gate 110) whether the data output from shift register 106 is the same as the data output from ECC 108 for the same digit of a digital word. In cases where the two relevant data bits are the same (i.e., "No" at process P2), the method may return to process P1 of comparing other data bits from shift register 106 and ECC 108. In cases where the two relevant data bits are different (i.e., "Yes" at process P2), the method may continue to other processes for determining whether error correction in shift register 106 is possible.

Process P3 in methods according to the disclosure may include identifying an error type which caused the mismatch between the data output from shift register 106 and ECC 108. The identification in process P3 may be implemented solely via ECC 108, or in some cases may be implemented using systems or processes external to ECC 108 and/or device(s) where ECC 108 is located. The identification in process P3 may distinguish between correctable errors (e.g., soft errors or other single error events) or non-correctable errors (i.e., double error detect events which may require a refresh of shift register 106). In some cases, the identified error types may include a non-correctable error such as a double error. Process P3 may be implemented by transmitting an error indication to other digital logic, e.g., transmitting a correctability signal from ECC 108 to second logic gate 112.

Methods according to the disclosure may include process P4 of determining whether the error(s) identified in process P3 are correctable by rewriting data to shift register 106. The determination in process P4 may include, e.g., using an AND gate or other process/device to implement an AND operation to sense whether an error has occurred (e.g., based on process P2) and whether the error is correctable (e.g., based on process P4). When both conditions are unsatisfied (i.e., "No" at process P4), the method may return to process P1 of comparing another set outputs from shift register 106 and ECC 108. Where both conditions are satisfied (i.e., "Yes" at process P4), the method may proceed to further operations for correcting the error.

Embodiments of the disclosure may include implementing process P5 of replacing an input to shift register 106 with the corresponding output from ECC 108. Replacing the data input to shift register 106 may include, e.g., using selector 105 to transmit the output data from ECC 108 as an input to shift register 106 instead of a corresponding data input from external circuit 104. Where applicable, process P5 may cause the output data from ECC 108 to overwrite a latch within shift register 106. The method may then conclude ("Done"), or may repeat processes P1-P5 as applicable via the corresponding phantom line in FIG. 3. In cases where methods according to the disclosure are implemented on memory circuit 116 (FIG. 2), processes P1-P5 may be implemented in parallel on multiple shift registers 106, and using multiple data bits output from ECC 108. In this manner, methods according to the disclosure may operate simultaneously and/or independently on multiple shift registers 106. In such cases, the parallel implementation may further ensure that ECC 108 will be available to correct errors at multiple locations and/or may be able to compensate for non-correctable errors.

Embodiments of the disclosure provide various technical and commercial advantages, some of which are described herein by way of example. Embodiments of the disclosure are operable to correct and replace single bit errors transmitted to shift register 106 in real time. In some circumstances, the errors are not replaced on a single bit at a time but may be corrected within shift register 106 on a word-by-word basis. Such correction may be implemented without disabling or otherwise interrupting continued operation of shift register 106 and/or ECC 108. Various embodiments may sense when a correction is being made by ECC 108 and replace the incorrect register value with the corrected value to free up ECC 108, so that later in time another error can be corrected. This may allow apparatus 100 to correct any number of ECC errors which appear serially over time (e.g., on every clock cycle). The likelihood that multiple single error events occur simultaneously is low. Embodiments of the disclosure may be especially advantageous for shift registers 106 which support robust memory circuitry and/or responsible for providing critical data to enable continuous and non-interrupted operation of a device. Furthermore, embodiments which rely on specialized logic circuitry (e.g., XOR gate, AND gate, and/or selector) avoid the use of other processing hardware and/or memory while having minimal effect on the area occupied by memory hardware. As also noted herein, embodiments of the disclosure are capable of operating on conventional configurations of shift register 106 and ECC 108 in a circuit without modifying existing pathways for transmitting and processing digital data.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit for replacing bit values in a shift register, the circuit comprising:
   a first logic gate for comparing output data from the shift register with output data from an error-correcting code circuitry (ECC), wherein the first logic gate outputs an error signal in response to a data bit output from the shift register being different from a data bit output from the ECC;
   a second logic gate for receiving the error signal from the first logic gate, and a correctability signal from the ECC indicating the data bit output from the shift register as being correctable, wherein the second logic gate outputs an overwrite signal in response to receiving the error signal and the correctability signal; and
   a selector receiving the overwrite signal and the data bit of the output data from the ECC, and coupled between a data source and an input line to the shift register, wherein the selector causes the shift register to receive the data bit of the output data from the ECC in response to receiving the overwrite signal.

2. The circuit of claim 1, wherein the first logic gate comprises an exclusive OR (XOR) gate or a set of compare function logic circuits.

3. The circuit of claim 1, wherein the second logic gate comprises an AND gate or a set of true function logic circuits.

4. The circuit of claim 1, wherein the ECC includes logic for distinguishing a soft error from other error types, and identifying the soft error as correctable.

5. The circuit of claim 1, wherein the shift register comprises a serial in serial out (SISO) register having a plurality of latches.

6. The circuit of claim 5, wherein the selector selecting the data bit of the output data from the ECC replaces a bit stored on a latch of the SISO register.

7. A memory circuit comprising a plurality of circuits according to claim 1 coupled in parallel and configured to process a parallel data input.

8. An apparatus comprising:
   a shift register for driving operation of a digital circuit;
   an error-correcting code circuitry (ECC) receiving an output from the shift register, the ECC being coupled to identify error bits in the output and classify the error bits as being a correctable error or a non-correctable error;
   first logic gate for comparing the output from the shift register with an output from the ECC, wherein the first logic gate outputs an error signal in response to a data bit output from the shift register being different from a data bit output from the ECC;
   a second logic gate for receiving the error signal from the first logic gate, and a correctability signal from the ECC indicating the data bit output from the shift register as being a correctable error, wherein the second logic gate outputs an overwrite signal in response to receiving the error signal and the correctability signal; and
   a selector receiving the overwrite signal and the data bit of the output from the ECC, and coupled between a data source and an input line to the shift register, wherein the selector causes the shift register to receive the data bit of the output from the ECC in response to receiving the overwrite signal.

9. The apparatus of claim 8, wherein the first logic gate comprises an exclusive OR (XOR) gate or a set of compare function logic circuits.

10. The apparatus of claim 8, wherein the second logic gate comprises an AND gate or a set of true function logic circuits.

11. The apparatus of claim 8, wherein the ECC includes logic for identifying the error bits as a correctable soft error.

12. The apparatus of claim 8, wherein the shift register comprises a serial in serial out (SISO) register having a plurality of latches.

13. The apparatus of claim 12, wherein the selector selecting the data bit of the output from the ECC replaces a bit stored on a latch of the SISO register.

14. A memory circuit comprising a plurality of apparatuses according to claim 8 coupled in parallel and configured to process a parallel data input.

15. A method for replacing bit values in a shift register, the method comprising:
   comparing output data from the shift register with output data from an error-correcting code circuitry (ECC);
   identifying an error in response to a data bit output from the shift register being different from a data bit output from the ECC;
   determining whether the error is a correctable error based on the ECC; and
   replacing a data input to the shift register with the output data from the ECC in response to identifying the error, and determining the error as correctable.

16. The method of claim 15, wherein comparing the output data from the shift register with the output data from the ECC includes transmitting the output data from the shift register and the output data from the ECC using a first logic gate to identify the error.

17. The method of claim 15, wherein determining whether the error is a correctable soft error via the ECC.

18. The method of claim 17, wherein determining whether the error is correctable includes outputting a correctability signal to a second logic gate, and outputting a signal indicative of the error to the second logic gate, wherein an output from the second logic gate causes a selector to replace the data input to the shift register with the output data from the ECC.

19. The method of claim 15, wherein replacing the data input to the shift register causes the output data from the ECC to overwrite a latch within the shift register.

20. The method of claim 15, further comprising implementing the comparing, the identifying, the determining, and the replacing on a plurality of additional shift registers coupled in parallel to a parallel data input.

* * * * *